United States Patent [19]

Saruta

[11] Patent Number: 4,636,693
[45] Date of Patent: Jan. 13, 1987

[54] DEFLECTION YOKE HAVING A FUNCTION FOR ADJUSTING DEFLECTION FIELD

[75] Inventor: Sadayoshi Saruta, Yokohama, Japan

[73] Assignee: Denki Onkyo Company Limited, Tokyo, Japan

[21] Appl. No.: 764,035

[22] Filed: Aug. 9, 1985

[30] Foreign Application Priority Data

Aug. 11, 1984 [JP] Japan ................................ 59-168478
Aug. 11, 1984 [JP] Japan ................................ 59-168479

[51] Int. Cl.$^4$ ........................ H01J 29/70; H01J 29/76
[52] U.S. Cl. ................................ 315/368; 315/370; 335/212; 335/213
[58] Field of Search ...................... 315/370, 371, 368; 335/212, 213

[56] References Cited

U.S. PATENT DOCUMENTS

| | | |
|---|---|---|
| 3,714,500 | 1/1973 | Kaashoek . |
| 3,898,520 | 8/1975 | Gerritsen et al. ............... 315/370 |
| 3,906,303 | 9/1975 | Gerritsen ........................ 315/370 |
| 4,095,143 | 6/1978 | Pridmore ........................ 315/370 |

Primary Examiner—Theodore M. Blum
Attorney, Agent, or Firm—Armstrong, Nikaido, Marmelstein & Kubovcik

[57] ABSTRACT

A pair of horizontal deflection coils of a deflection yoke comprises a combination of two horizontal coil sections and a current regulator for regulating the horizontal deflection current which flows through the coils is connected across these two horizontal coil sections. The winding sections extending in the direction of the tube axis along the neck of the cathode-ray tube for two horizontal coil sections are formed so that the same distribution of conductor is not provided in the same quadrants which are divided by X and Y axes.

4 Claims, 12 Drawing Figures

DEFLECTION YOKE HAVING A FUNCTION FOR ADJUSTING DEFLECTION FIELD

BACKGROUND OF THE INVENTION

The present invention relates to a deflection yoke for use in a color television receiver set, specifically a deflection yoke adapted to adjust a deflection current which flows in a horizontal deflection coil and generates a desired deflection field.

Generally, in a color television receiver set which employs an in-line type cathode-ray tube or a delta type cathode-ray tube, pictures are provided by electron guns which produce red, green and blue electron beams. In this case, the deflection yoke is mounted on a neck of the cathode-ray tube to converge electron beams on the screen surface. The deflection yoke is constituted to obtain an optimum self-convergence by appropriately setting a horizontal deflection field and a vertial deflection field.

However, the deflection coil comprises a horizontal deflection coil, a vertical deflection coil and a core. Once the deflection coil is fabricated, it is difficult to adjust a variation of unallowable manufacturing error which is found after fabrication and, similarly, once the cathode-ray tube is fabricated, it is also difficult to adjust a variation of unallowable manufacturing error which is found after manufacture. To adjust such variation of unallowable manufacturing error of the deflection yoke or the cathode-ray tube, a convergence yoke is employed or a magnetic piece or a piece of magnet is attached to the deflection yoke.

However, the use of the convergence yoke is disadvantageous in that not only the adjustment of concentration of electron beams is complicated but the costs of the deflection circuitry which includes the deflection yoke are increased. The use of the magnetic piece or a piece of magnet is also disadvantageous in that the range of adjustment is limited to a local field, readjustment cannot be freely carried out and the accuracy after adjustment is not satisfactory. Particularly, the display of character information on the screen is required to provide only an extremely small misconvergence. The above-mentioned measures cannot provide a substantial effect to eliminate misconvergence.

The coils which were wound to obtain an optimum field cannot always provide the optimum field due to restrictions in manufacture and construction and therefore there have been a problem that the coils should be designed with a certain degree of misconvergence left, that is, a problem of a remainder of design.

An object of the present invention is to provide a deflection yoke adapted to obtain a desired deflection field by correcting the distribution of the deflection field generated from the horizontal deflection coil through adjustment of the quantity of current flowing in the coil by the deflection current regulator.

Another object of the present invention is to provide a deflection yoke adapted to generate the deflection field which permits self-convergence by varying the horizontal deflection current flowing in the horizontal deflection coil through the deflection current regulator.

The deflection yoke in accordance with the present invention is provided with a pair of horizontal deflection coils, a pair of vertical deflection coils and a deflection core. The horizontal deflection coil comprises two horizontal coil sections across which a current regulator is connected to allow differential adjustment of horizontal deflection current which flows in these horizontal coil sections.

The horizontal coil sections have two windings which extend in the direction of the axis of cathode-ray tube along the neck of the cathode-ray tube. The winding of one of horizontal coil sections has a conductor distribution of dispersed winding and the winding of the other horizontal coil section has a conductor distribution of concentrated winding, or the winding of one of two horizontal coil sections has a conductor distribution of dispersed winding and the other winding of the other of two horizontal coil sections has a conductor distribution of concentrated winding.

DETAILED DESCRIPTION OF THE INVENTION

Figure 1:
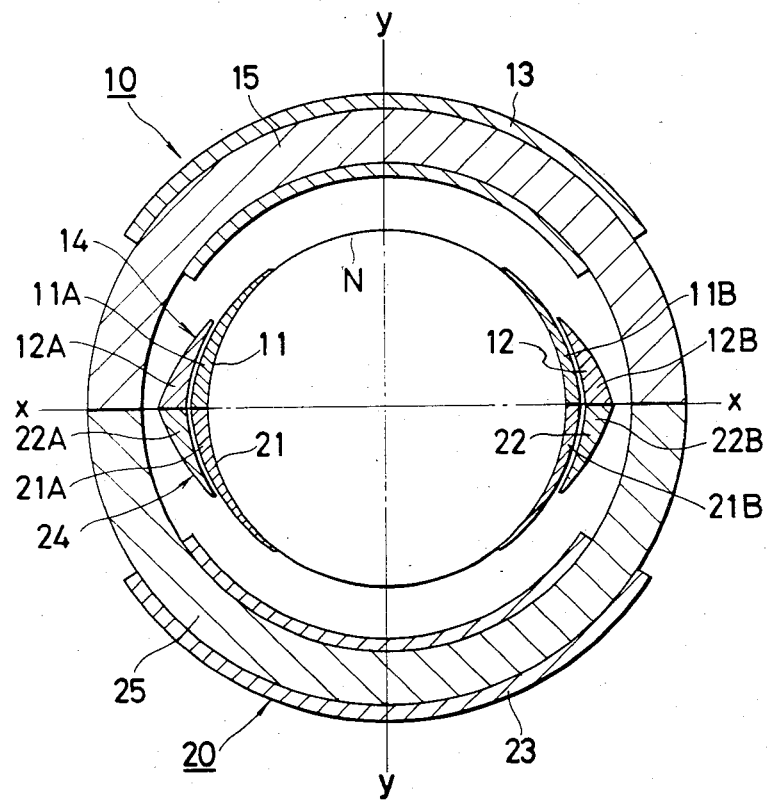
FIG. 1 is a cross sectional view of the deflection yoke according to the present invention as viewed along a plane at right angles to the axial direction of the deflection yoke, showing a brief diagram simplifying the drawing.

Referring the FIG. 1, there is shown the construction of the deflection yoke in accordance with the present invention for which four guadrants are specified by designating the X axis to the horizontal direction and the Y axis to the vertical direction while the direction of electron guns is viewed from the screen. A part of the deflection yoke above the X axis is designated as the upper side deflection yoke part 10 and a part of the deflection yoke below the X axis as the lower side deflection yoke part 20. Windings 11A and 11B which extend in the axial direction of the cathode-ray tube along the neck N of the cathode-ray tube form the first horizontal coil section 11 which is referred to as the dispersed winding symmetrically wound in reference to the Y axis and having a dispersed conductor distribution. Similarly, windings 12A and 12B form the second horizontal coil section 12 which is referred to as the concentrated winding symmetrically wound in reference to the Y axis and having a concentrated conductor distribution.

These first and second horizontal coil sections 11 and 12 jointly form one horizontal deflection coil. The vertical deflection coil 13 is toroidally wound around the core half 15.

On the other hand, in the lower side deflection yoke part 20, the windings 21A and 21B form the third horizontal coil section 21 which is referred to as the dispersed winding symmetrically wound in reference to the Y axis and having a dispersed conductor distribution. The windings 22A and 22B form the fourth horizontal coil section 22 which is referred to as the concentrated winding symmetrically wound in reference to the Y axis and having a concentrated conductor distribution. These third and fourth horizontal coil sections 21 and 22 jointly form one horizontal deflection coil 24. The vertical deflection coil 23 is toroidally wound around the core half 25.

Figure 2:
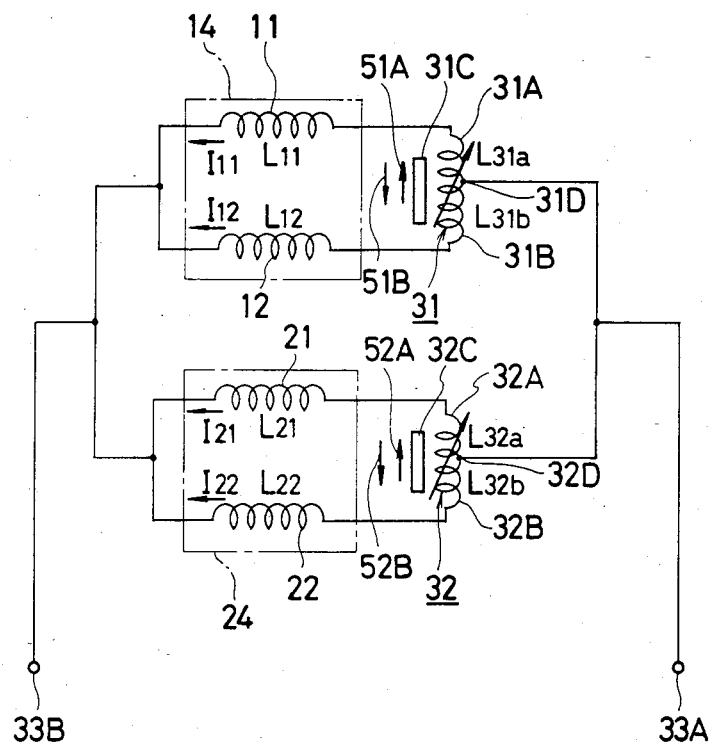
FIG. 2 shows a circuit for use in the deflection yoke of the present invention.

Referring to FIG. 2, there is shown a circuit of the deflection yoke including horizontal coil sections 11, 12, 21 and 22 as shown in FIG. 1. This circuit includes the current regulators 31 and 32 as the variable inductance coils.

Coils 31 and 32 of regulators are adapted so that the inductance varies when movable cores 31A and 32A are actuated. One-side ends of horizontal coil sections 11 and 12 of the horizontal deflection coil 14 are connected to both ends of the variable inductance coil 31, and one-side ends of horizontal coil sections 21 and 22 of the horizontal deflection coil 24 are connected to both ends of the variable inductance coil 32. Intermediate points 31B and 32B of variable inductance coils 31 and 32 are connected to the horizontal deflection current terminal 33A. The other-side ends of horizontal coil sections 11, 12, 21 and 22 are connected in parallel with the other-side ends and to the deflection current terminal 33B.

Figure 3:
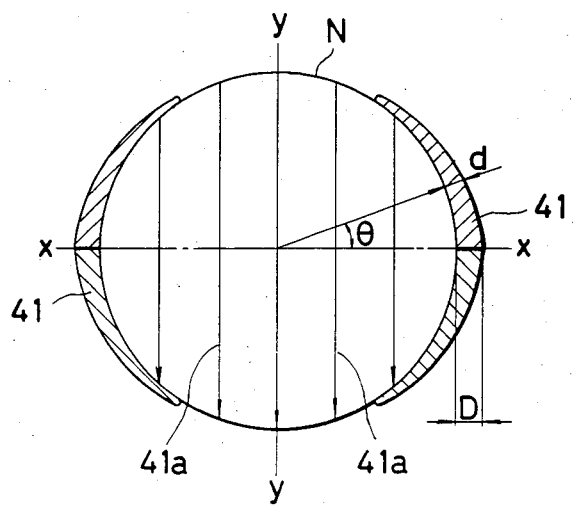
FIG. 3 to FIG. 5 show a principle of the deflection yoke of the present invention.

The following describes the operation of the deflection yoke. FIG. 3 shows the horizontal deflection coils wound to generate a uniform field distribution in the neck N. In FIG. 3, assuming the radial thickness of the horizontal deflection coil 41 at a desired angle $\theta$ as d and the radial thickness of said horizontal deflection coil 41 at the joint end face as D, the "uniform winding" is referred to the conductor distribution of the winding wound as specified by the formula given below.

$$d = D \cos \theta \quad (1)$$

In this case, the center of gravity of the cross section of the coil is in the position represented by $\theta = 30°$. If the horizontal coil 41 is wound according to said formula (1), a uniform field 41a in parallel with the Y axis is obtained.

Figure 4:
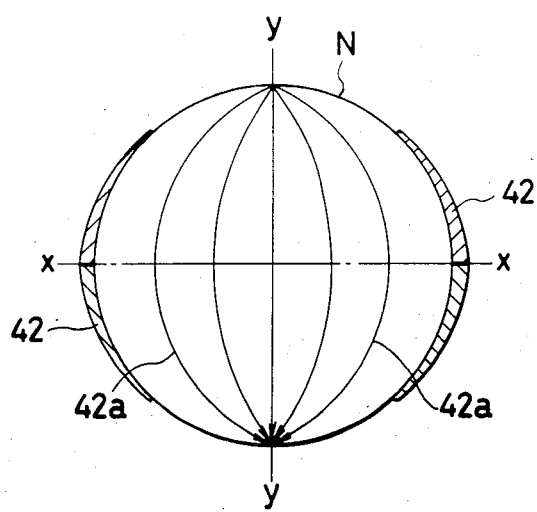

On the other hand, FIG. 4 shows the field distribution in the neck N of the cathode-ray tube when the horizontal deflection coil is dispersedly wound. In this case, the dispersed winding is referred to as a conductor distribution of the winding when the center of gravity of the cross section of the horizontal deflection coil 42 is positioned at a position represented by $\theta > 31°$, and if the horizontal deflection coil 42 is dispersedly wound, a barrel field 42a is obtained.

Figure 5:
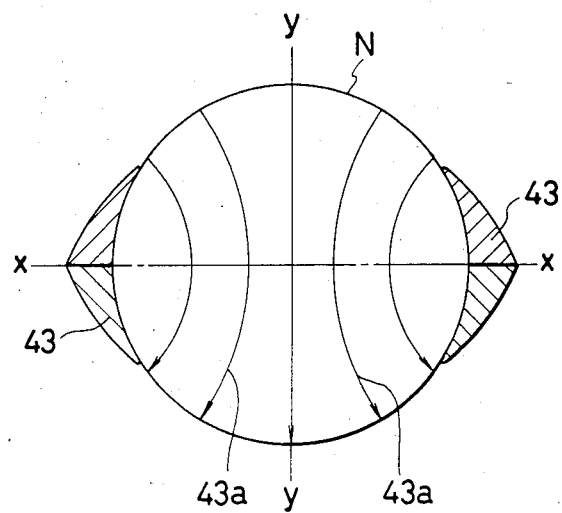

Moreover, FIG. 5 shows the field distribution in the neck N when the horizontal deflection coil is concentratedly wound. In this case, the concentrated winding is referred to the conductor distribution of the winding when the center of gravity of the cross section of the horizontal deflection is at the position represented by $\theta > 30°$. If the horizontal deflection coil 43 is concentratedly wound, a pin cushion type field 43a is obtained.

In the embodiment of the invention, the inductance values of variable inductance coils 31 and 32 in FIG. 2 can be appropriately adjusted from the intermediate position where a uniform field is obtained and the field distribution generated from horizontal coil sections 11, 12, 21 and 22 can be adjusted to a desired field distribution by varying the deflection current flowing through said horizontal coil sections 11, 12, 21 and 22.

The following describes in detail the above-mentioned embodiment of the invention. The inductance values of horizontal coil sections 11, 12, 21 and 22 are respectively assumed as $L_{11}$, $L_{12}$, $L_{21}$ and $L_{22}$ which are set to $L_{11} = L_{12} = L_{21} = L_{22}$.

Meantime, it is assumed that the inductance values $L_{31a}$, $L_{31b}$, $L_{32a}$ and $L_{32b}$ of upper and lower windings 31A, 31B, 32A and 32B of variable inductance coils 31 and 32 are set to $L_{31a} = L_{31b} = L_{32a} = L_{32b}$ if movable cores 31C and 32C are set at the intermediate positions 31D and 32D.

If movable cores 31C and 32C are assumed to have been moved from the above neutral condition to the arrow-indicated directions 51A and 52A shown in the upper part in FIG. 2, the inductance values of variable inductance coils 31 and 32 become $L_{31a} > L_{31b}$ and $L_{32a} > L_{32b}$ and the following relationship is obtained.

$$L_{11} + L_{31a} > L_{12} + L_{31b}$$

$$L_{21} + L_{32a} > L_{22} + L_{32b} \quad (2)$$

If the deflection currents flowing through horizontal coil sections 11, 12, 21 and 22 are respectively $I_{11}$, $I_{12}$, $I_{21}$ and $I_{22}$, the equational relationship given below is obtained, $$I_{11} = I_{21} < I_{12} = I_{22} \quad (3)$$

Figure 6:
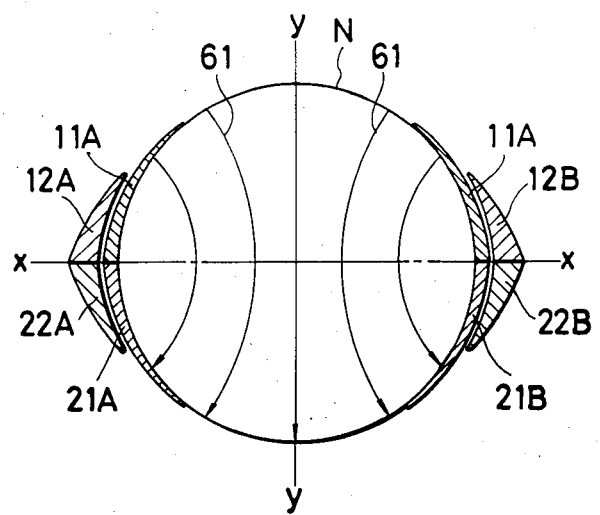
FIG. 6 to FIG. 8 are respectively an explanatory diagram of a characteristic field distribution of the deflection yoke of the present invention.

Accordingly, the field generated by horizontal coil sections 12 and 22 is stronger than the field generated by horizontal coil sections 11 and 22, and a pin cushion type field 61 can be obtained in the neck N as shown in FIG. 6.

If movable cores 31C and 32C are assumed to have been moved from the above-mentioned neutral position to the arrow-indicated directions 51B and 52B in the lower part of FIG. 2, the inductance values of variable inductance coils 31 and 32 become $L_{31a} < L_{31b}$ and $L_{32a} < L_{32b}$, and the following equational relationship is obtained.

$$L_{11} + L_{31a} < L_{12} + L_{21b}$$

$$L_{21} + L_{32a} < L_{22} + L_{32b} \quad (4)$$

Accordingly, the equational relationship given below is obtained, and deflection currents $I_{11}$, $I_{12}$, $I_{21}$ and $I_{22}$ flowing through horizontal coil sections 11, 12, 21 and 22 are as shown below.

$$I_{11} = I_{21} > I_{12} = I_{22} \quad (5)$$

Figure 7:
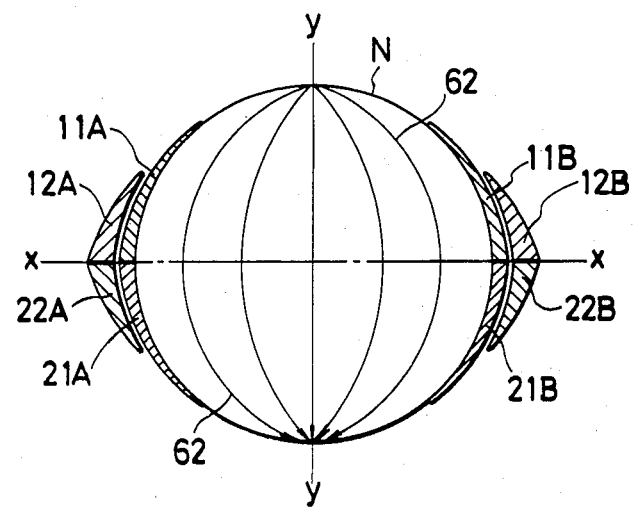

In this case, the field generated by horizontal coil sections 11 and 21 is stronger than that generated by horizontal coil sections 12 and 22 and therefore a barrel type field 62 as shown in FIG. 7 is obtained in the neck N.

When movable cores 31C and 32C are set at intermediate positions 31D and 32D, the following equational relationship is obtained.

$$L_{31a} = L_{31b} = L_{32a} = L_{32b}$$

$$I_{11} = I_{12} = I_{21} = I_{22} \quad (6)$$

Accordingly, a uniform field similar to that as shown in FIG. 3 can be obtained.

Figure 8:
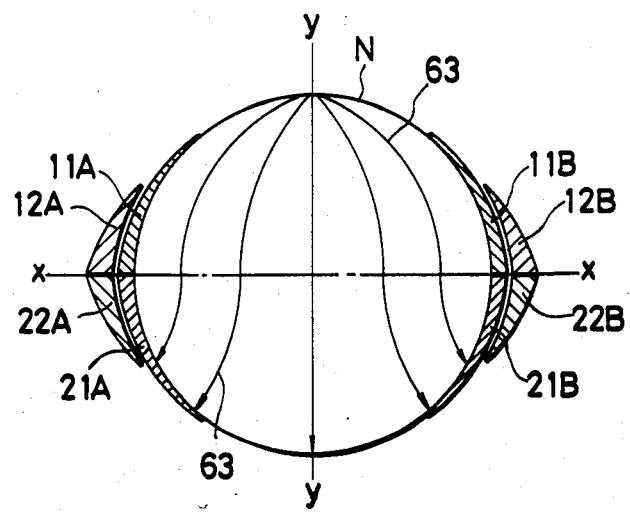

On the other hand, if adjustment is carried out so that the following equational relationship is obtained by moving the movable core 31C in the arrow-indicated direction 51B and the movable core 32C in the arrow-indicated direction 52A, a field 63 as shown in FIG. 8 can be obtained.

As described above, the horizontal deflection field distribution can be obtained as a pin cushion type field to a barrel type field and further as a field showing an unspecified distribution, as shown in FIGS. 6 to 8, by adjusting movable cores 31C and 32C of movable inductance coils 31 and 32.

FIG. 3 shows another embodiment of a modified horizontal deflection coil of the present invention. Horizontal deflection coils 70 and 80 to be arranged around the neck N of the cathode-ray tube are respectively formed with a combination of two modified horizontal coil sections, each having the dispersed winding and the concentrated winding. In other words, the horizontal deflection coil 70 comprises the first horizontal coil section 71 which has the dispersed winding 71A at the left side of the Y axis and the concentrated winding 71B at the right side of the Y axis and the second horizontal coil section 72 which has the concentrated winding 72A at the left side of the Y axis and the dispersed winding 72B of the Y axis.

The horizontal deflection coil 80 comprises the third horizontal coil section consisting of the dispersed winding 81A and the concentrated winding 81B and the fourth horizontal coil section consisting of the concentrated winding section 82A and the dispersed winding section 82B.

Horizontal coil section 71, 72 and 81, 82 are connected to the deflection yoke circuit as shown in FIG. 2. Specifically, horizontal coil sections 71 and 72 are connected to the positions corresponding to coils 11 and 12 and horizontal coil sections 81 and 82 to the positions corresponding to coils 21 and 22.

Figure 10:
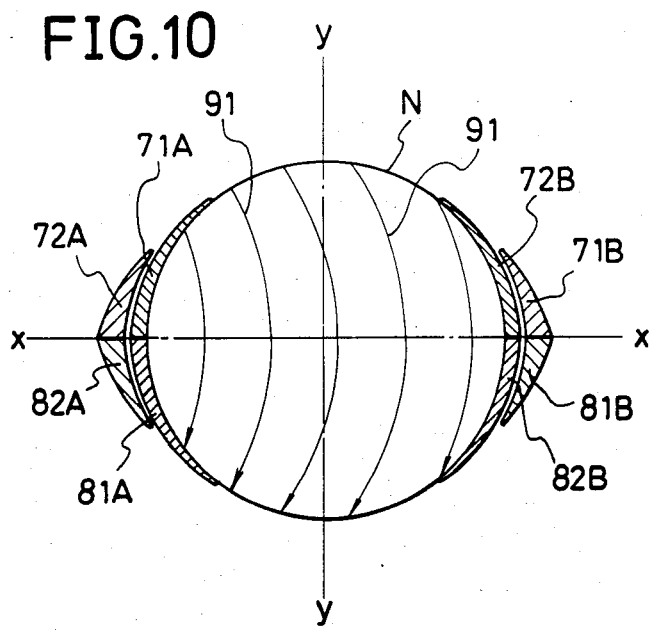
FIG. 10 to FIG. 12 are respectively an explanatory view of field distribution when the coil as shown in FIG. 9 is used.
Figure 11:
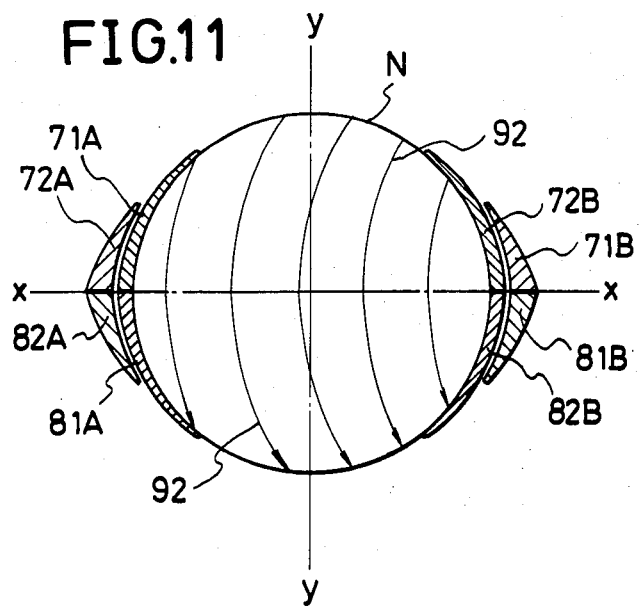

If the movable core of the variable inductance coil is moved from the neutral position to allow a large amount of horizontal deflection current to flow in the second horizontal coil section 72 and the fourth horizontal coil section 82, the field in the neck N of the cathode-ray tube is generated as a pin cushion type field at the left side of the Y axis and a barrel type field at the right side of the Y axis, and as a curved deflection field 91 as a whole, as shown in FIG. 10. If the movable core is moved from the neutral position in an opposite direction to that in FIG. 10, a deflection field 92 as shown in FIG. 11 is obtained.

Figure 12:
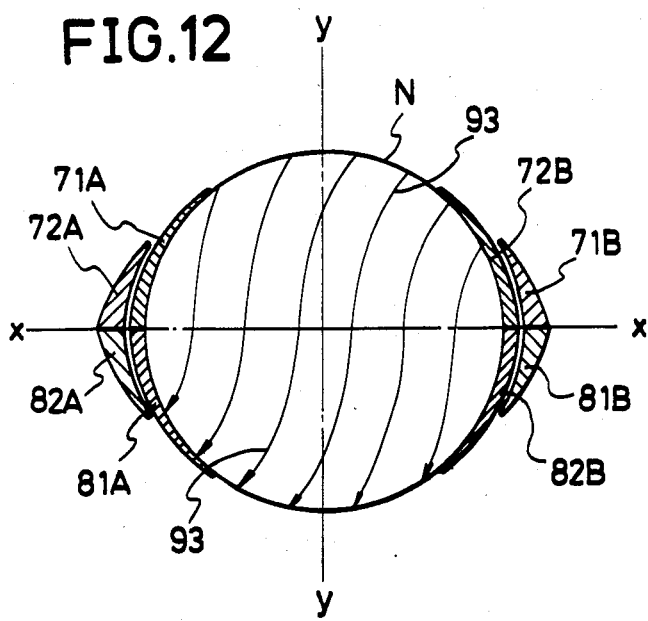

If the movable core of the variable inductance coil is moved from the neutral position to allow a large amount of horizontal deflection current to flow in the first horizontal coil section 71 and the fourth horizontal coil section 82, a deflection field 93 as shown in FIG. 12 is obtained.

Figure 9:
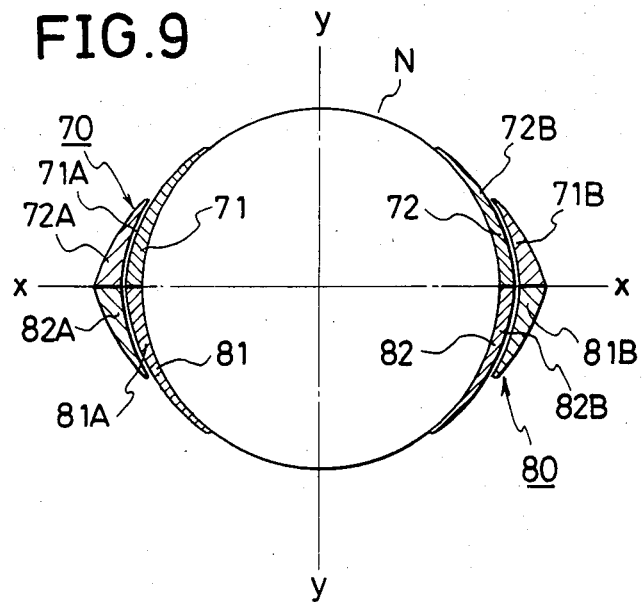
FIG. 9 is a cross sectional view of the horizontal deflection coil showing another ambodiment of the present invention.

In other words, the horizontal deflection coil of the embodiment shown in FIG. 9 can provide a field distribution having a pattern different from the deflection yoke shown in FIG. 1.

In case of the deflection yoke according to the present invention, the deflection field distribution can be varied by adjusting the variable inductance coils and therefore the deflection field which is capable of compensating the unallowable manufacturing error of the deflection yoke can be corrected as the deflection yoke being mounted on the cathode-ray tube. Accordingly, the deflection yoke of the present invention is advantageous in that adjustment of the convergence is easy and high precision pictures can be obtained. The horizontal deflection coil shown in FIG. 9 is applicable to the deflection yoke for the projection type television.

Moreover, the deflection yoke can be provided with saddle type vertical deflection coils.

What is claimed is:

1. A deflection yoke for use in a color television cathode-ray tube having three electron guns provided in an in-line arrangement, comprising
    (a) a deflection core,
    (b) a pair of vertical deflection coils,
    (c) an upper horizontal deflection coil having a first and a second horizontal coil section, and
        a lower horizontal deflection coil having a third and a fourth horizontal coil section, each of said coil sections being formed and wound independently of one another, wherein an x-axis and a y-axis, perpendicular to the axis of the cathode-ray tube, form a cartesian coordinate system having 4 quadrants, such that said upper horizontal deflection coil is positioned in the upper 2 quadrants, and said lower horizontal deflection coil is positioned in the lower 2 quadrants,
    each of said horizontal coil sections having two windings which extend along a neck of said cathode-ray tube, each coil section having a distinct and specific coil distribution, such that
        (1) a first quadrant includes one of said windings from said first horizontal coil section, and one of said windings from said second horizontal coil section,
        (2) a second quadrant includes another one of said windings from said first horizontal coil section and another one of said windings from said second horizontal coil section, said second quadrant being adjacent said first quadrant, said first and second quadrants comprising said upper 2 quadrants,
        (3) said third quadrant includes one of said windings from said third horizontal coil section, and one of said windings from said fourth horizontal coil section, said third quadrant being adjacent said first quadrant,
        (4) said fourth quadrant includes another one of said windings from said third horizontal coil section, and another one of said windings from said fourth horizontal coil section, said fourth quadrant being adjacent said second and third quadrants, and
    wherein, one winding in each quadrant has a dispersed conductor distribution, while the other winding in each quadrant has concentrated conductor distribution, and
    (d) a current regulating means which is connected across said two horizontal coil sections to provide differential variation of a quantity of horizontal deflection current to be supplied to said two horizontal coil sections.

2. A deflection yoke in accordance with claim 1, wherein two windings of the two horizontal coil sections which comprise a horizontal deflection coil are wound in the same conductor distribution.

3. A deflection yoke in accordance with claim 1, wherein one of two windings of each horizontal coil sections which form a horizontal deflection coil is formed as a dispersed winding and the other is formed as a concentrated winding.

4. A deflection yoke in accordance with claim 1, wherein a current regulating means is formed as a variable inductance coil having a movable core and serves to differentially vary a horizontal deflection current flowing through two horizontal coil sections when said movable core is moved.

* * * * *